(12) United States Patent
Fukuda et al.

(10) Patent No.: US 11,496,016 B2
(45) Date of Patent: Nov. 8, 2022

(54) STATOR, ROTARY ELECTRIC MACHINE, AND MANUFACTURING METHOD FOR STATOR

(71) Applicant: Hitachi Automotive Systems, Ltd., Hitachinaka (JP)

(72) Inventors: Tomohiro Fukuda, Hitachinaka (JP); Kenichi Nakayama, Hitachinaka (JP); Motoo Kitahara, Hitachinaka (JP); Kazuo Ojima, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 271 days.

(21) Appl. No.: 16/064,840

(22) PCT Filed: Nov. 25, 2016

(86) PCT No.: PCT/JP2016/084883
§ 371 (c)(1),
(2) Date: Jun. 21, 2018

(87) PCT Pub. No.: WO2017/110360
PCT Pub. Date: Jun. 29, 2017

(65) Prior Publication Data
US 2019/0006904 A1   Jan. 3, 2019

(30) Foreign Application Priority Data
Dec. 25, 2015   (JP) ............................. JP2015-252807

(51) Int. Cl.
*H02K 15/04* (2006.01)
*H02K 3/12* (2006.01)
(Continued)

(52) U.S. Cl.
CPC ........... *H02K 3/50* (2013.01); *H02K 15/0062* (2013.01); *H02K 15/04* (2013.01); *H02K 3/12* (2013.01); *H02K 15/045* (2013.01)

(58) Field of Classification Search
CPC ...... H02K 3/50; H02K 15/0062; H02K 15/04; H02K 15/03; H02K 3/12; H02K 15/045
(Continued)

(56) References Cited

U.S. PATENT DOCUMENTS 2,759,161 A * 8/1956 Berg .................... H01R 4/2495
439/424
6,369,474 B1   4/2002 Tanaka et al.
(Continued)

FOREIGN PATENT DOCUMENTS

CN   105071087 A   11/2015
EP   1124284 B1 * 1/2004 ............. H01R 4/187
(Continued)

OTHER PUBLICATIONS

Japanese-language International Search Report (PCT/ISA/210) issued in PCT Application No. PCT/JP2016/084883 dated Mar. 7, 2017 with English translation (four (4) pages).
(Continued)

*Primary Examiner* — Gary A Nash
(74) *Attorney, Agent, or Firm* — Crowell & Moring LLP (57) ABSTRACT

Provided is a rotor capable of improving the reliability of a connection between a lead conductor and a terminal member. A stator includes a winding wound around a stator core and having a lead conductor at an end thereof, and a terminal
(Continued)

member having a connection portion to the lead conductor of the winding. The connection portion of the terminal member includes a winding-side connection portion that fixes the lead conductor, and a leading-end-side connection portion that fixes a portion closer to a leading end of the lead conductor than the winding-side connection portion.

10 Claims, 9 Drawing Sheets

(51) Int. Cl.
*H02K 3/50* (2006.01)
*H02K 15/00* (2006.01)

(58) Field of Classification Search
USPC .......................................................... 310/71
See application file for complete search history.

(56) References Cited

U.S. PATENT DOCUMENTS

| | | | | |
|---|---|---|---|---|
| 7,145,116 | B2* | 12/2006 | Keishima | H05B 6/1245 219/672 |
| 9,054,569 | B2* | 6/2015 | Kuroda | H02K 3/50 |
| 2003/0129856 | A1 | 7/2003 | Takizawa et al. | |
| 2007/0271773 | A1* | 11/2007 | Tamura | H02K 15/0025 29/735 |
| 2015/0187462 | A1* | 7/2015 | Kondo | H01R 4/023 310/71 |
| 2016/0189824 | A1* | 6/2016 | Fukuda | H01B 3/307 174/117 R |

FOREIGN PATENT DOCUMENTS

| | | |
|---|---|---|
| JP | 54-180201 U1 | 12/1979 |
| JP | 8-9577 A | 1/1996 |
| JP | 10-199600 A | 7/1998 |
| JP | 2001-231209 A | 8/2001 |
| JP | 2003-209944 A | 7/2003 |
| JP | 2003-338327 A | 11/2003 |
| JP | 2010-20980 A | 1/2010 |
| JP | 2011-113670 A | 6/2011 |
| JP | 2015-115240 A | 6/2015 |

OTHER PUBLICATIONS

Japanese-language Written Opinion (PCT/ISA/237) issued in PCT Application No. PCT/JP2016/084883 dated Mar. 7, 2017 (five (5) pages).
Chinese-language Office Action issued in counterpart Chinese Application No. 201680067953.7 dated Jul. 24, 2019 with English translation (17 pages).
Japanese-language Office Action issued in counterpart Japanese Application No. 2017-557807 dated Jul. 30, 2019 with English translation (eight (8) pages).

* cited by examiner

STATOR, ROTARY ELECTRIC MACHINE, AND MANUFACTURING METHOD FOR STATOR

TECHNICAL FIELD

The present invention relates to a stator, a rotary electric machine, and a manufacturing method for a stator.

BACKGROUND ART

A rotary electric machine, such as a motor or a generator, which is mounted on a vehicle, such as an electric vehicle or a hybrid automobile, connects a lead conductor of a winding wound around a stator core to a rectifier. The lead conductor is provided so as to extend toward an end of the winding, and a metal terminal is bonded to a leading end of the lead conductor by soldering or the like. The metal terminal is attached to, for example, an external device, such as a rectifier, with a fastening member such as a screw. The rotary electric machine is installed in a high-temperature place with a large vibration, such as within an engine room, or in the vicinity of the engine room. Therefore, soldering causes thermal degradation, which may lead to an increase in bonding resistance at a bonded portion between the lead conductor and the metal terminal, or may lead to a disconnection.

In this regard, a structure is known in which a metal terminal is provided with bonding pieces that extend at both ends thereof in the width direction; a lead conductor is nipped by the bonding pieces from the both sides and swaged and fixed; and the bonding pieces and the lead conductor are fixed by arc welding between the bonding pieces (e.g., see PTL 1).

CITATION LIST

Patent Literature

PTL 1: JP 2001-231209 A

SUMMARY OF INVENTION

Technical Problem

In the structure described in PTL 1, the bonding pieces of the metal terminal and the lead conductor are swaged at one place, and the bonding pieces of the metal terminal and the lead conductor are fixed by arc welding only at the location between the bonding pieces of the metal terminal. In other words, the area in which the bonding pieces and the lead conductor are fixed by arc welding is set only at the location between the bonding pieces of the metal terminal. Accordingly, a fixing strength for a vibration in a predetermined direction, such as a vibration generated on a surface parallel to a welding surface around the welding area, is insufficient, which makes it difficult to secure the reliability of the connection.

Solution to Problem

According to a first aspect of the present invention, a stator includes: a winding wound around a stator core and having a lead conductor at an end thereof; and a terminal member having a connection portion to the lead conductor of the winding, wherein the connection portion of the terminal member includes a winding-side connection portion that fixes the lead conductor, and a leading-end-side connection portion that fixes a portion closer to a leading end of the lead conductor than the winding-side connection portion.

According to a second aspect of the present invention, a rotary electric machine includes the stator according to the first aspect described above.

According to a third aspect of the present invention, provided is a manufacturing method for a stator including a winding wound around a stator core and having a lead conductor at an end thereof, and a terminal member having a connection portion to the lead conductor of the winding, the connection portion of the terminal member including a winding-side connection portion that fixes the lead conductor, and a leading-end-side connection portion that fixes a portion closer to a leading end of the lead conductor than the winding-side connection portion, the manufacturing method including: a first step of fixing the lead conductor and the leading-end-side connection portion by metal fusion bonding; and a second step of fixing the lead conductor and the winding-side connection portion by coupling different from the metal fusion bonding, or by mechanical coupling.

Advantageous Effects of Invention

According to the present invention, a lead conductor is fixed by a winding-side connection portion and a leading-end-side connection portion of a terminal member, thereby improving the reliability of a connection between the lead conductor and the terminal member.

DESCRIPTION OF EMBODIMENTS

Embodiments of the present invention will be described below with reference to the drawings.

In the following description, a rotary electric machine for a hybrid electric vehicle is used as an example of a rotary electric machine. Further, in the following description, the term "axial direction" refers to a direction along the rotation axis of the rotary electric machine. The term "circumferential direction" refers to a direction along the rotation direction of the rotary electric machine. The term "radial direction" refers to a radial vector direction (radial direction) about the rotation axis of the rotary electric machine. The term "inner peripheral side" refers to a radially inner side (inner diameter side), and the term "outer peripheral side" refers to a direction opposite to the inner peripheral side, i.e., a radially outer side (outer diameter side).

An outline of embodiments will now be described.

Embodiments described herein relate to a structure for fixing a lead conductor and a terminal member in a stator for a rotary electric machine. The rotary electric machine, including a motor, a generator, and a motor/generator, includes a stator having a cylindrical shape and a rotor disposed at a predetermined gap at the inner peripheral side of the stator.

The stator has a plurality of magnetic poles that are arranged such that different magnetic poles are alternately arranged in the rotation direction, and includes a stator core having a cylindrical shape and a plurality of stator coils wound around the stator core and constituting phase windings. For example, in a three-phase AC rotary electric machine, stator coils of U-phase, V-phase, W-phase, and the like which are annularly provided along the circumferential direction of the stator core are arranged in the radial direction of the stator core.

The stator core has a configuration in which a plurality of slots that accommodate the stator coil and penetrate in the axial direction are arranged in the circumferential direction of the stator core. The stator coils of the respective phases are formed by electrically connecting a large number of conductors that are accommodated and arranged in the respective slots. Specifically, the stator coils of the respective phases include a plurality of conductors extending in the axial direction within the slots, and leading line portions each led from one end of each slot in the axial direction. The leading line portions each extend across the plurality of slots spaced apart from each other at predetermined circumferential pitches.

According to an embodiment of the present invention, the stator coils of the respective phases each include a lead conductor for external connection. At an end of the lead conductor, a terminal structure portion in which a terminal member formed of a conductive member, such as metal, is bonded is provided. The terminal member includes a winding-side connection portion connected to the winding side of the lead conductor, and a leading-end-side connection portion connected to a portion closer to a leading end of the lead conductor than the winding-side connection portion. The lead conductor is connected by a plurality of connection portions, i.e., the winding-side connection portion of the terminal member and the leading-end-side connection which is provided separately from the winding-side connection portion. Accordingly, a fixing strength between the lead conductor and the terminal member is increased, resulting in an improvement in the reliability of the connection.

First Embodiment

A first embodiment of the present invention will be described with reference to FIGS. 1 and 6.

Figure 1:
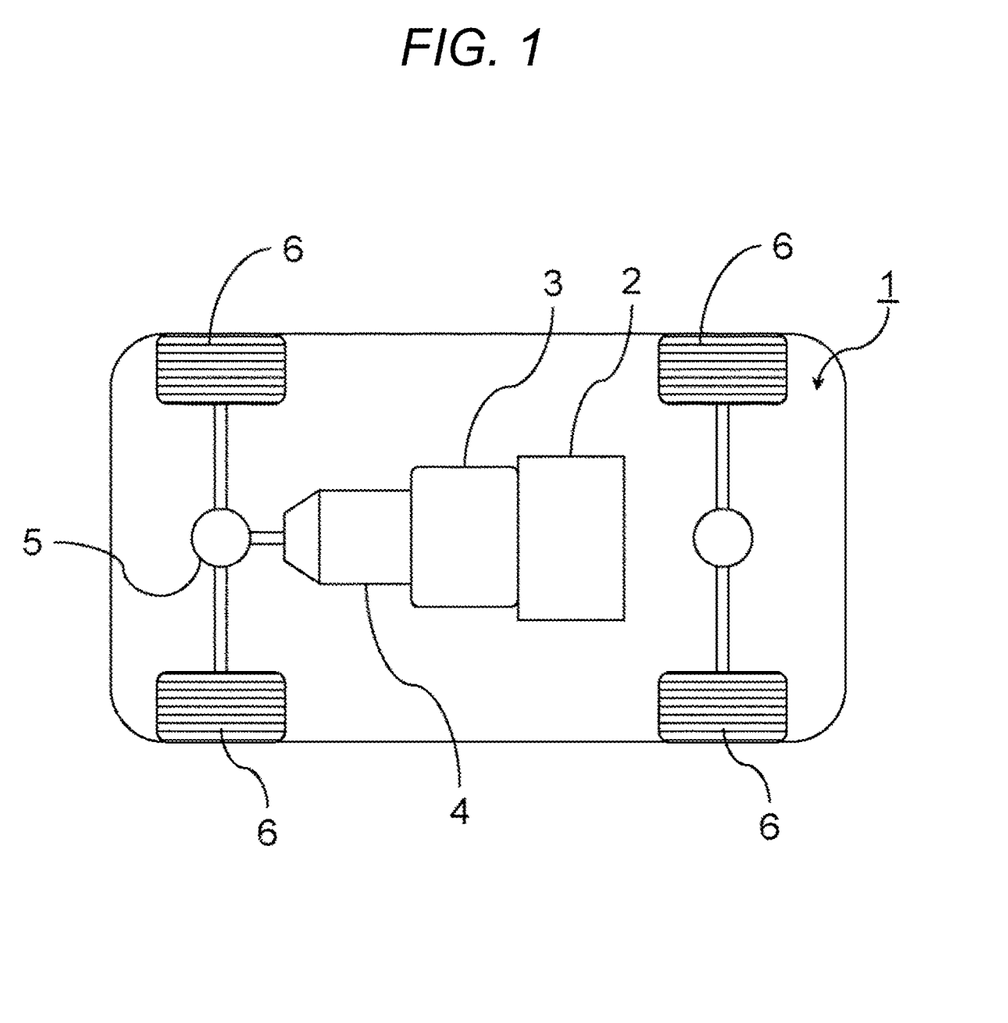
FIG. 1 is a block diagram of a hybrid electric vehicle.

FIG. 1 is a block diagram of a hybrid electric vehicle on which a rotary electric machine according to the embodiment of the present invention is mounted.

An engine 2, which is a vehicle power source, and a rotary electric machine 3 are mounted on a vehicle 1. FIG. 1 illustrates one rotary electric machine 3. However, a plurality of rotary electric machines 3 may be mounted on the vehicle 1. The plurality of rotary electric machines 3 may include different functions, such as a motor, a generator, or a motor/generator. Further, one of the rotary electric machines may perform both power generation and driving of the vehicle, and other ones of the rotary electric machines may perform driving of the vehicle. Thus, the rotary electric machines may have different roles.

A rotation torque generated by the engine 2 and the rotary electric machine 3 is transmitted to wheels 6 through a transmission 4, such as a continuously variable transmission or a stepped automatic transmission, and a differential gear 5. The rotary electric machine 3 is mounted between the engine 2 and the transmission 4, or in the transmission 4. The rotary electric machine 3 is required to be downsized and have a high output so that the space occupied by the rotary electric machine 3 within the vehicle 1 can be minimized.

Figure 2:
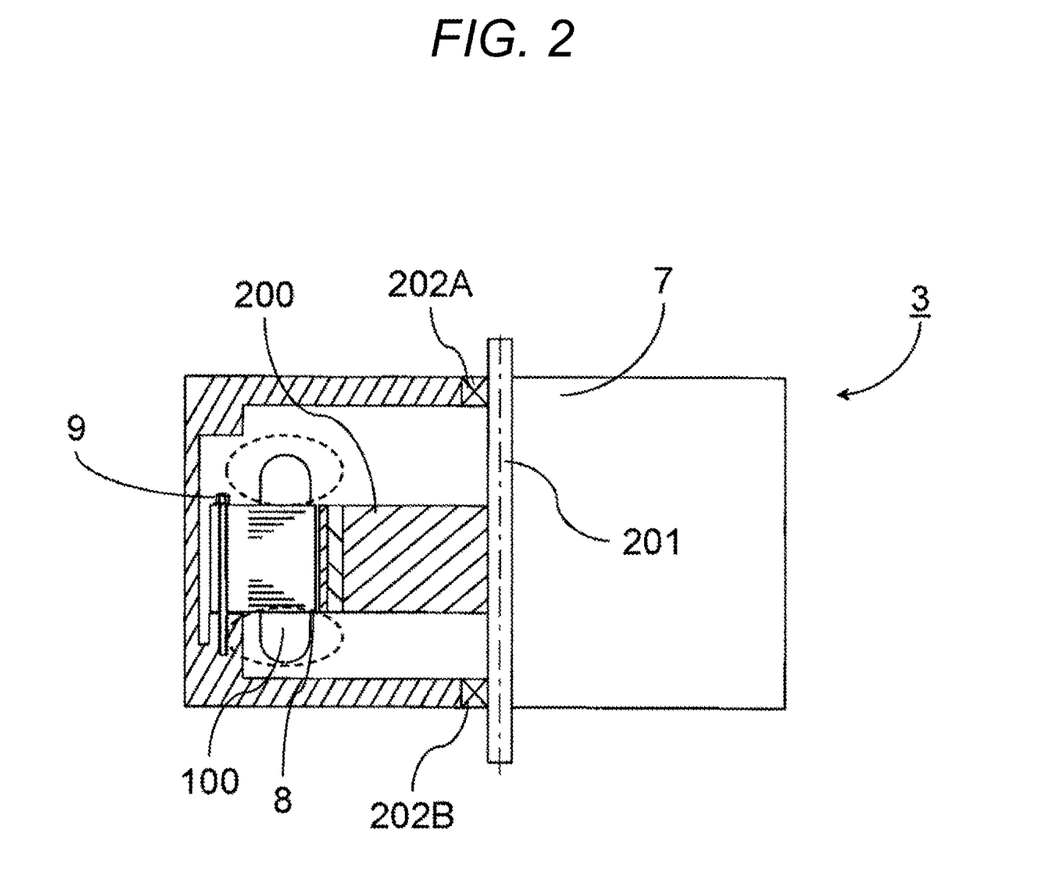
FIG. 2 is a sectional view of a rotary electric machine according to a first embodiment of the present invention.

FIG. 2 is a sectional view of the rotary electric machine according to the first embodiment of the present invention. Note that FIG. 2 illustrates a section of an area located at the left side of a shaft 201 which is a drive shaft of the rotary electric machine 3, and also illustrates a side view of an area located at the right side of the shaft.

The rotary electric machine 3 is disposed so as to be accommodated in a case 7. As illustrated in FIG. 1, in the structure in which the rotary electric machine 3 is disposed between the engine 2 and the transmission 4, the case 7 is formed using a case for the engine 2 or a case for the transmission 4. Further, in the structure in which the rotary electric machine 3 is mounted in the transmission 4, the case 7 is formed using the case for the transmission 4.

The rotary electric machine 3 includes a stator 100 and a rotor 200. The rotor 200 is disposed at the inner peripheral side of the stator 100 through a gap 8. The rotor 200 is fixed to the shaft 201, for example, by press-fitting and rotated integrally with the shaft 201. Both ends of the shaft 201 are rotationally supported by bearings 202A and 202B. The bearings 202A and 202B are supported by the case 7. The outer peripheral side of the stator 100 is fixed to the inner peripheral side of the case 7 by using a bolt 9 or the like. The stator 100 and the case 7 may be coupled by shrink-fitting. The rotary electric machine 3 illustrated in FIG. 2 is a three-phase synchronous motor in which the rotor 200 includes a permanent magnet (not illustrated), and the stator 100 is supplied with a large (e.g., about 300A) three-phase alternating current, thereby allowing the rotary electric machine to operate as a motor.

Figure 3:
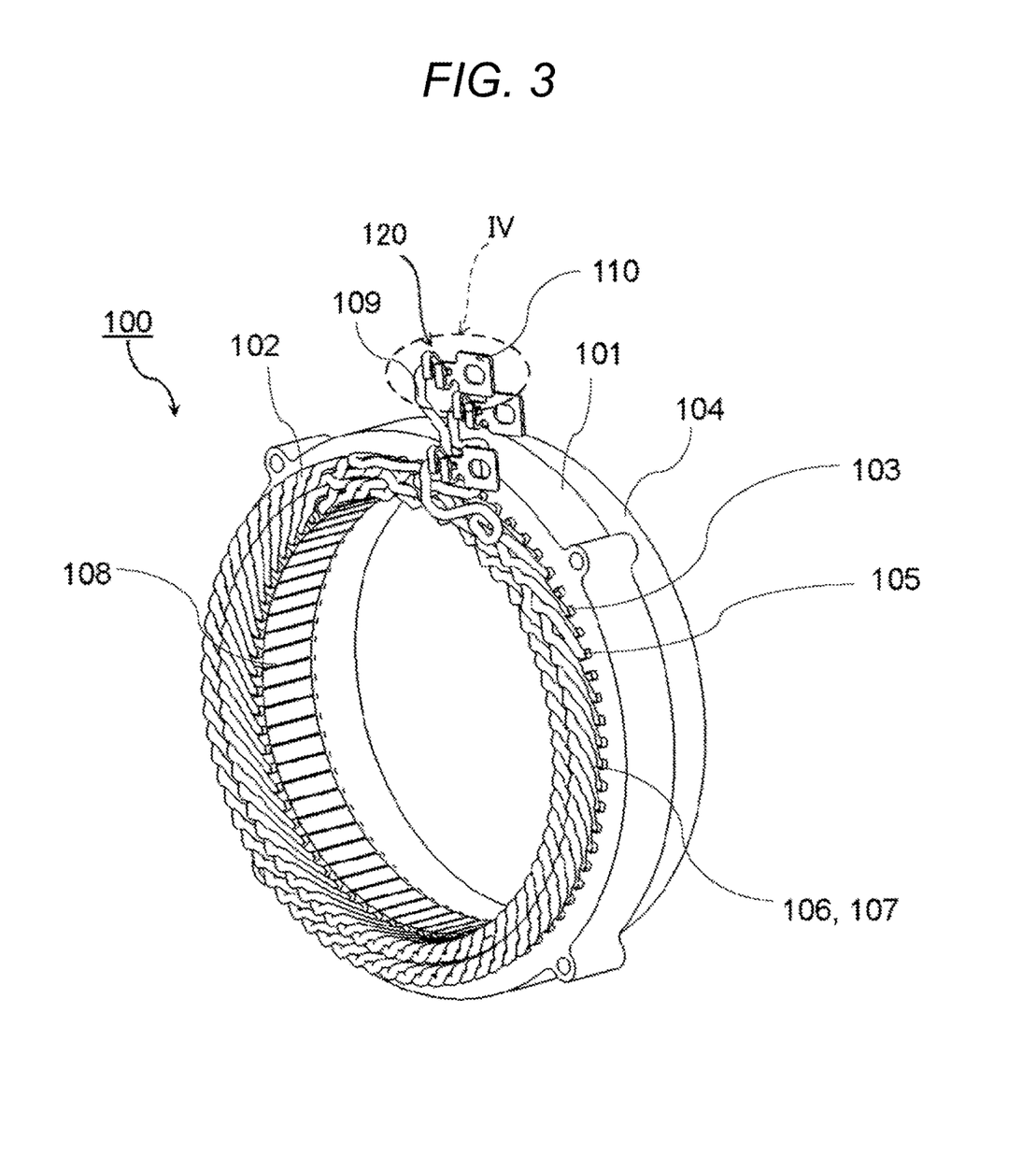
FIG. 3 is a detailed perspective view of a stator of the rotary electric machine illustrated in FIG. 2.

FIG. 3 is a detailed perspective view of the stator of the rotary electric machine illustrated in FIG. 2.

The stator 100 includes a stator core (also referred to as a stator iron core) 101 having a plurality of slots 105 formed at the inner peripheral side, and three-phase stator coils 102 that are phase windings wound around the stator core 101 and constituting phase windings of U-phase, V-phase, and W-phase. Each stator coil 102 is formed of oxygen-free copper or oxygen-containing copper. When oxygen-containing copper is used, for example, the oxygen content is in a range from about 10 ppm to 1000 ppm. When oxygen-free copper is used, the stator coil is formed of 6N (99.9999%)-level copper in normal. The slots 105 formed at the inner peripheral side of the stator core 101 are arranged at regular intervals in the circumferential direction at predetermined circumferential pitches. Each of the slots 105 is formed so as to penetrate in the axial direction of the stator core 101. At the inner peripheral side of the stator core 101, a plurality of slits 108 extending in the axial direction is formed.

The stator coils 102 of the respective phases are inserted into the slots 105 and include a large number of conductors 106 to be held. An end of each conductor 106 is led out from one end face (one end face on the back side in FIG. 3) in the axial direction of the stator core 101. The led-out portions of the conductors 106 that are adjacent to each other in the same slot 105 are connected by being welded with a welding portion 104. In this manner, the stator coils 102 of the respective phases connected to the led-out portions of the conductors, respectively, are annularly wound substantially around the perimeter of the stator core 101. Insulating paper 103 is inserted into each slot 105. The stator core 101 and the portion corresponding to the conductors 106 inserted into the slots 105 are isolated by the insulating paper 103.

Each stator coil 102 includes a leading line portion 107 that has a substantially U-shape or substantially V-shape and is led out from the other end (one end face on the front side in FIG. 3) of each slot 105 in the axial direction. The leading line portion 107 extends across the plurality of slots 105 spaced apart from each other by predetermined circumferential pitches. Further, a plurality of magnetic poles that are arranged such that different magnetic poles are alternately arranged in the rotation direction are generated by the plurality of stator coils 102.

An end of each stator coil 102 is provided with a terminal structure portion 120 for external connection for each of the U-phase, the V-phase, and the W-phase. The stator coils 102 of the respective phases can exchange power with an external connection device through the terminal structure portion 120.

Figure 4:
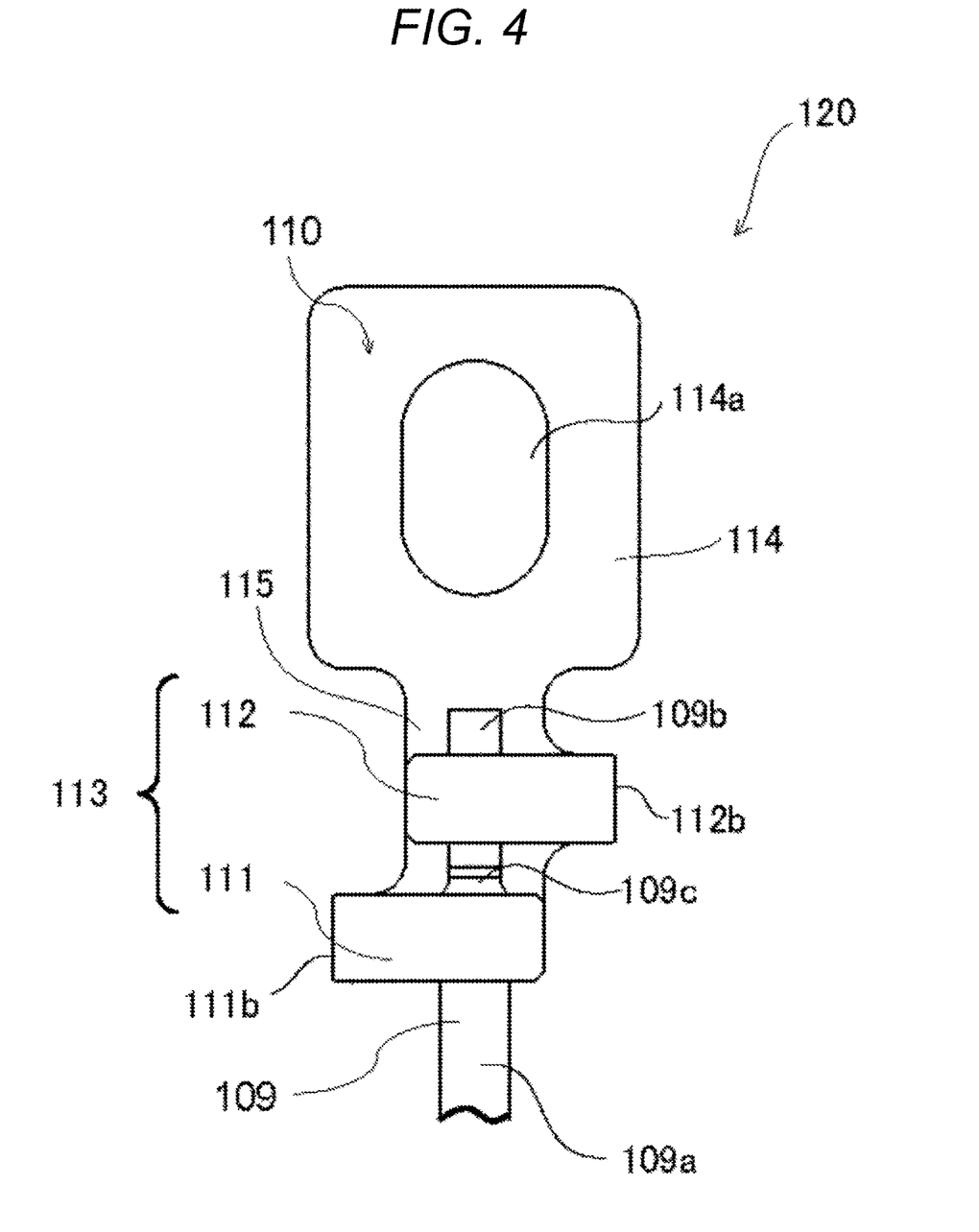
FIG. 4 is an enlarged view of an area IV including a terminal structure portion illustrated in FIG. 3.

FIG. 4 is an enlarged view of an area IV including the terminal structure portion 120 illustrated in FIG. 3.

As illustrated in FIG. 4, the terminal structure portion 120 includes a lead conductor 109 and a terminal member 110 that fixes the lead conductor 109. The lead conductor 109 is formed of, for example, oxygen-free copper or oxygen-containing copper, and includes a main body portion 109a, a leading end portion 109b, and a boundary portion 109c between the main body portion 109a and the leading end portion 109b. The lead conductor 109 may be a round wire or a square wire. The main body portion 109a is connected to the stator coil 102 at the other end thereof which is not illustrated. The leading end portion 109b is formed with a diameter smaller than that of the main body portion 109a, or with a width smaller than that of the main body portion 109a. The boundary portion 109c is formed with a slope and tapered toward the leading end portion 109b from the main body portion 109a.

The terminal member 110 includes a connection portion 113, which is composed of a winding-side connection portion 111 and a leading-end-side connection portion 112, an external connection portion 114, and a base 115 that connects the external connection portion 114 and the connection portion 113. The terminal member 110 is formed of a conductive member made of metal such as copper. The external connection portion 114 has a rectangular shape in plan view and has an opening 114a formed at a central portion thereof. The external connection portion 114 is connected to an external device, such as a rectifier, in a state where the external connection portion is fixed with a screw, a bolt, or the like which is inserted into the opening 114a.

The winding-side connection portion 111 includes a bent-back portion 111b formed at the left side of the base 115. The winding-side connection portion 111 is bent back at the bent-back portion 111b, is electrically connected to the main body portion 109a of the lead conductor 109 in a state where the main body portion 109a of the lead conductor 109 is nipped, and fixes the main body portion 109a of the lead conductor 109.

The leading-end-side connection portion 112 includes a bent-back portion 112b formed at the right side of the base 115. The leading-end-side connection portion 112 is bent back at the bent-back portion 112b, is electrically connected to the leading end portion 109b of the lead conductor 109 in a state where the leading end portion 109b of the lead conductor 109 is nipped, and fixes the leading end portion 109b of the lead conductor 109. In other words, the leading-end-side connection portion 112 of the terminal member 110 and the leading end portion 109b of the lead conductor 109 are bonded together.

That is, the terminal member 110 fixes the lead conductor 109 at two connection portions, i.e., the winding-side connection portion 111 and the leading-end-side connection portion 112.

Figure 5:
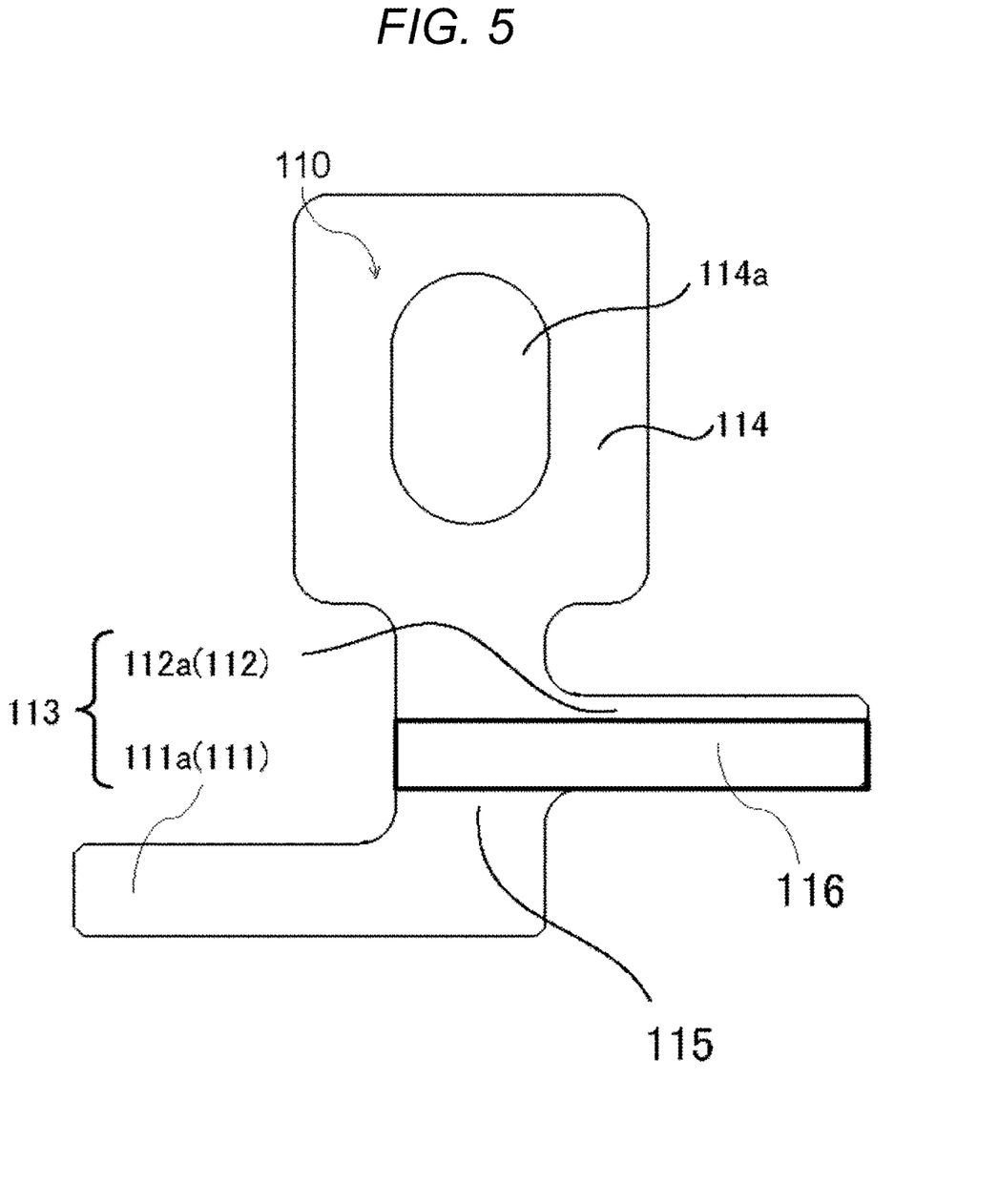
FIG. 5 is a development view of a terminal member illustrated in FIG. 4.

FIG. 5 is a development view of the terminal member illustrated in FIG. 4, i.e., illustrating the shape of the terminal member 110 before the lead conductor 109 is fixed.

The winding-side connection portion 111 of the terminal member 110 includes a winding-side nipping piece 111a that extends from the base 115 in a direction substantially perpendicular to the base 115 at the left side of the base 115. The leading-end-side connection portion 112 of the terminal member 110 includes a leading-end-side nipping piece 112a that extends from the base 115 in a direction substantially perpendicular to the base 115 at the right side of the base 115.

The leading-end-side connection portion 112 of the terminal member 110 includes the leading-end-side nipping piece 112a that extends in the direction substantially perpendicular to the base 115 to the right side of the base 115. One surface of the leading-end-side nipping piece 112a of the terminal member 110 is provided with a bonding member 116 that is formed of a material having a melting point lower than that of the lead conductor 109 which is a connected member. The bonding member 116 is provided over the entire length of the leading-end-side nipping piece 112a in the extending direction thereof and is provided so as to extend to a side edge of the base 115. When the lead conductor 109 is formed of copper, the bonding member 116 is formed by, for example, soldering or copper phosphorus brazing. The lead conductor 109 may be a clad material obtained by rolling and bonding the bonding member 116.

Figure 6:
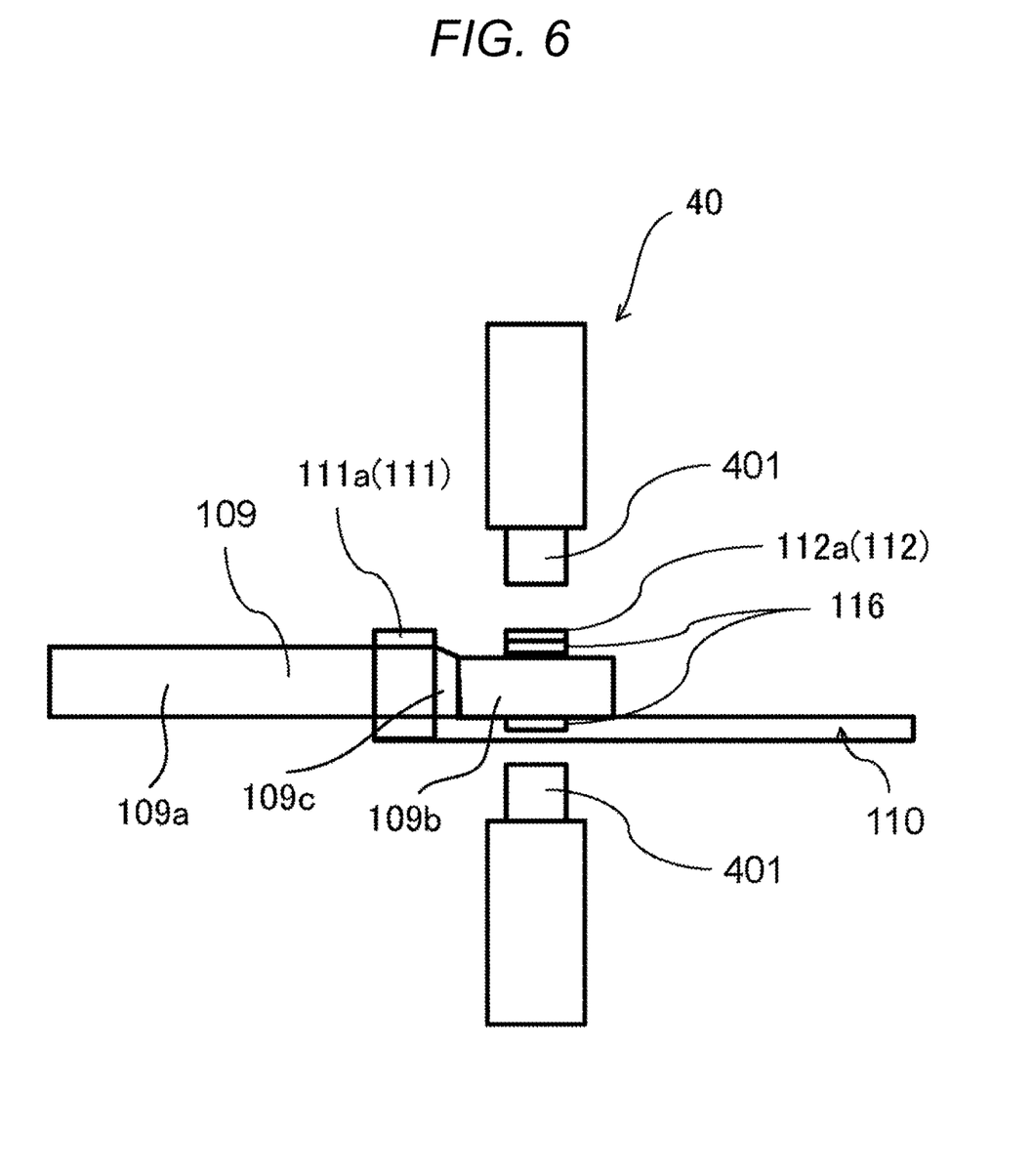
FIG. 6 is a schematic view illustrating a process of bonding a lead conductor and the terminal member.

FIG. 6 is a schematic view illustrating a process of bonding the lead conductor 109 and the terminal member 110.

A method for bonding the leading-end-side connection portion 112 of the terminal member 110 and the leading end portion 109b of the lead conductor 109 will be described with reference to FIG. 6.

The leading-end-side nipping piece 112a of the terminal member 110 is bent back substantially at an intermediate portion in the extending direction with a portion closer to the bonding member 116 facing inward, and is allowed to contact the upper and lower surfaces of the leading end portion 109b in a state where the leading end portion 109b of the lead conductor 109 is nipped. Electrodes 401 of resistance welders 40 are pressed with a predetermined pressure from the upper and lower sides of the leading-end-side nipping piece 112a that nips the leading end portion 109b of the lead conductor 109, and a current is caused to flow between the electrodes 401 in this state. Thus, the surface of the bonding member 116 and the surface of the leading end portion 109b of the lead conductor 109 generate heat and are melted. An alloy layer is generated between the surface of the bonding member 116 and the surface of the leading end portion 109b of the lead conductor 109, so that the leading end portion 109b of the lead conductor 109 and the leading-end-side connection portion 112 of the terminal member 110 are bonded together. As a material for the electrodes 401 of the resistance welders 40, a tungsten (W)-based or molybdenum (Mo)-based material can be used.

To bond the winding-side connection portion 111 of the terminal member 110 and the main body portion 109a of the lead conductor 109, the winding-side nipping piece 111a of the terminal member 110 is bent back at the intermediate portion in the extending direction by nipping and swaging the main body portion 109a of the lead conductor 109. In the case of performing the swaging process, the resistance welders 40 for bonding the leading-end-side connection portion 112 of the terminal member 110 and the leading end portion 109b of the lead conductor 109 may be used. In this case, however, there is no need to cause a current to flow between the electrodes 401 of the resistance welders 40.

The leading-end-side connection portion 112 of the terminal member 110 and the leading end portion 109b of the lead conductor 109 are connected by metal fusion bonding, and the winding-side connection portion 111 of the terminal member 110 and the main body portion 109a of the lead conductor 109 are connected by swaging that is not associated with metal melting. Accordingly, if the metal fusion bonding is performed first, the position of the bent-back portion 111b of the winding-side connection portion 111 of the terminal member 110 can be adjusted in accordance with the positions and states the leading-end-side connection portion 112 of the terminal member 110 and the leading end portion 109b of the lead conductor 109 which are fixed by metal fusion bonding. Therefore, the winding-side connection portion 111 of the terminal member 110 and the main body portion 109a of the lead conductor 109 can be effectively swaged. On the contrary, if swaging of the winding-side connection portion 111 of the terminal member 110 and the main body portion 109a of the lead conductor 109 is performed first, when the leading-end-side connection portion 112 of the terminal member 110 and the leading end portion 109b of the lead conductor 109 are fixed by metal fusion bonding, it may become difficult to align the bonding member 116 with the leading end portion 109b of the lead conductor 109, or to allow the entire surfaces of the bonding member 116 and the leading end portion 109b of the lead conductor 109 to uniformly contact each other. However, the order of these processes is not limited, but instead may be reversed.

According to the first embodiment of the present invention, the following advantageous effects are obtained.

(1) The connection portion 113 of the terminal member 110 includes the winding-side connection portion 111 that connects the lead conductor 109, and the leading-end-side connection portion 112 that fixes a portion closer to the leading end of the lead conductor 109 than the winding-side connection portion 111. In other words, the terminal member 110 electrically connects and fixes the lead conductor 109 at two different positions in the extending direction of the lead conductor 109. Accordingly, a stress acting on the connection portion 113 due to an external force, such as a vibration, is dispersed and decreased, and a connection strength at the connection portion 113 can be increased. This leads to an improvement in the reliability of the connection.

(2) The leading-end-side connection portion 112 of the terminal member 110 is bonded to the lead conductor 109 by metal fusion bonding, and the winding-side connection portion 111 of the terminal member 110 fixes the lead conductor 109 by swaging as mechanical connection. In other words, metal fusion bonding associated with a composition change of a bonded portion due to a heat input from the outside is performed only at the leading-end-side connection portion 112. Accordingly, variations in electrical characteristics associated with a composition change of the lead conductor 109 can be suppressed. In addition, in the winding-side connection portion 111, the lead conductor is fixed by swaging as mechanical coupling, thereby improving the reliability of the connection with respect to an external force such as a vibration.

(3) The quantity of heat transferred to the winding-side connection portion 111 of the terminal member 110 from the lead conductor 109 is smaller than the quantity of heat transferred to the leading-end-side connection portion 112 of the terminal member 110 from the lead conductor 109. In other words, the leading-end-side connection portion 112 to be bonded by metal fusion bonding with a large quantity of heat transferred to the leading-end-side connection portion 112 from the lead conductor 109 is located at a portion closer to the leading end of the lead conductor 109 than the winding-side connection portion 111, which is connected by mechanical coupling. Accordingly, variations in electrical characteristics associated with a composition change of the lead conductor 109 can be minimized.

(4) A manufacturing method for the stator according to the first embodiment includes a first step of connecting the lead conductor 109 and the leading-end-side connection portion 112 of the terminal member 110 by metal fusion bonding, and a second step of fixing the lead conductor 109 and the winding-side connection portion 111 of the terminal member 110 by mechanical coupling. In other words, the lead conductor 109 and the terminal member 110 are fixed by metal fusion bonding associated with a composition change of the bonded portion due to a heat input from the outside, and by another coupling method that is not associated with metal fusion bonding. Consequently, variations in electrical characteristics associated with a composition change of the lead conductor 109 can be minimized so that the variations are minimized, and the reliability of the connection with respect to an external force, such as a vibration, can be improved.

Second Embodiment

Figure 7:
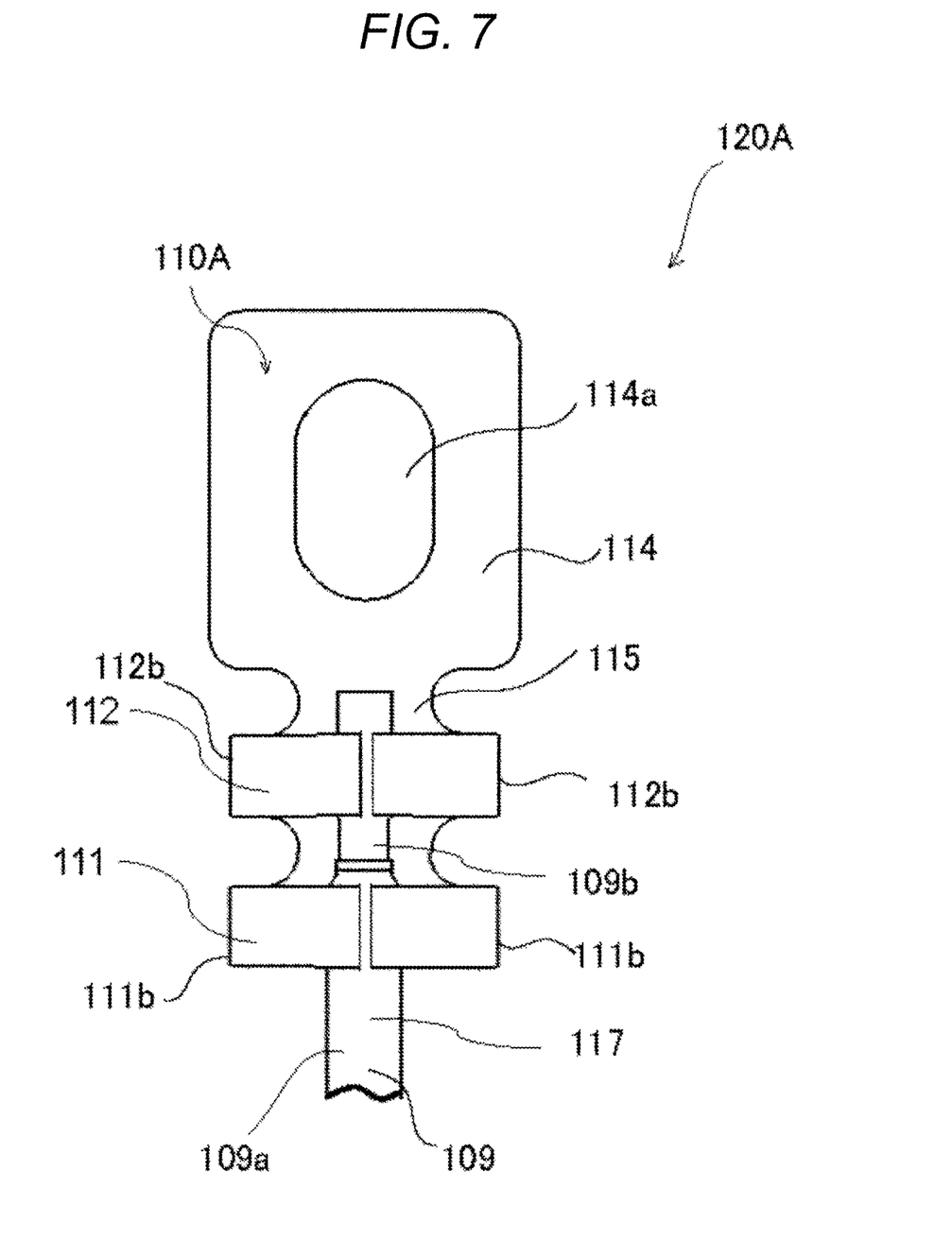
FIG. 7 is a front view illustrating a second embodiment of the present invention and also illustrating the terminal structure portion in which the terminal member and the lead conductor are fixed.
Figure 8:
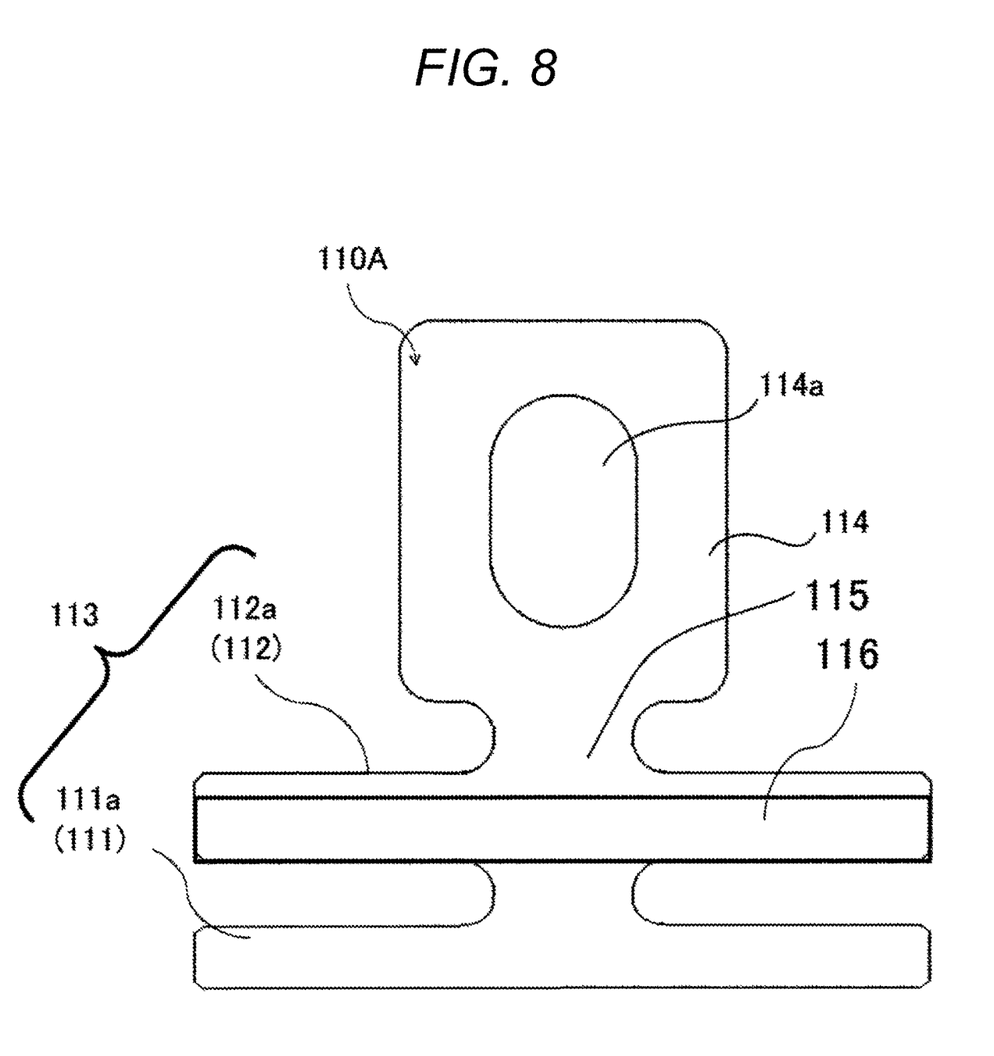
FIG. 8 is a development view of the terminal member illustrated in FIG. 7.

FIG. 7 illustrates a second embodiment of the present invention and also illustrates a front view of a terminal structure portion 120A in which a terminal member 110A and the lead conductor 109 are fixed. FIG. 8 is a development view of the terminal member 110A illustrated in FIG. 7.

The second embodiment includes a structure in which an insulating film 117 is provided on the surface of the main body portion 109a of the lead conductor 109. In this case, however, the insulating film 117 is not provided at the leading end portion 109b of the lead conductor 109. Further, in the second embodiment, the winding-side connection portion 111 and the leading-end-side connection portion 112 of the terminal member 110A include bent-back portions 111b and 112b, respectively. The bent-back portions 111b and 112b are provided on each of the right and left sides of the base 115.

The insulating film 117 is formed of an insulating material, such as inverter surge resistant enamel resin, which has a thermal conductivity lower than that of each of the lead conductor 109 and the terminal member 110. The use of the inverter surge resistant enamel resin as the insulating film 117 ensures sufficient insulating properties between windings even when the stator 100 is exposed to an excessive surge voltage, and thus prevents deterioration in the insulating properties of the insulating film 117. Note that a conductive material may be used in place of the insulating film 117.

As illustrated in FIG. 8, the terminal member 110A has a structure in which the winding-side nipping piece 111a of the winding-side connection portion 111 and the leading-end-side nipping piece 112a of the leading-end-side connection portion 112 extend to the right and left sides in a direction perpendicular to the extending direction of the base 115.

As illustrated in FIG. 7, the winding-side connection portion 111 and the leading-end-side connection portion 112 are each bent back at the bent-back portion 111b or the bent-back portion 112b at the right and left sides of the base 115, and fix the main body portion 109a or the leading end portion 109b of the lead conductor 109 substantially at a central portion of the base 115. A method for bonding the lead conductor 109 and the terminal member 110A is similar to that of the first embodiment, except that the main body portion 109a of the lead conductor 109 and the winding-side connection portion 111 of the terminal member 110A are swaged via the insulating film 117. Further, the other structure of the terminal structure portion 120A according to the second embodiment is similar to that of the terminal structure portion 120 according to the first embodiment.

Therefore, also in the second embodiment of the present invention, the advantageous effects (1) to (4) of the first embodiment are obtained.

Further, in the second embodiment, an insulating material having a thermal conductivity lower than that of the lead conductor 109 and the terminal member 110A is interposed between the main body portion 109a of the lead conductor 109 and the winding-side connection portion 111 of the terminal member 110A. Accordingly, when the leading end portion 109b of the terminal member 110A and the leading end portion 109b of the lead conductor 109 are bonded together, a heat input to the lead conductor 109 from the outside can be further suppressed and the advantageous effect (4) can be further enhanced.

Third Embodiment

Figure 9:
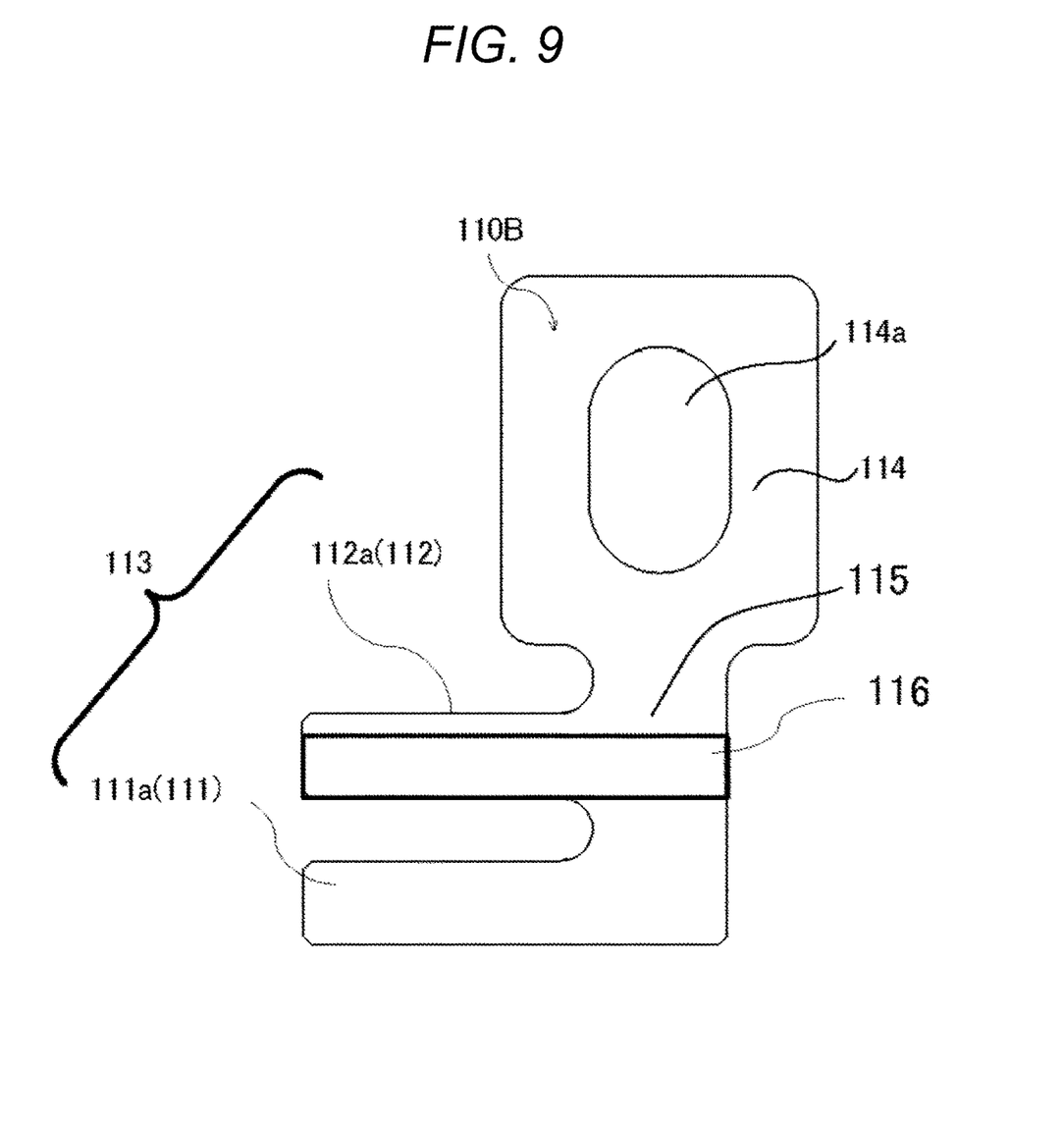
FIG. 9 is a development view of a terminal member according to a third embodiment of the present invention.

FIG. 9 is a development view of a terminal member according to a third embodiment of the present invention.

In the third embodiment, a terminal member 110B has a structure in which both members of the winding-side nipping piece 111a of the winding-side connection portion 111 and the leading-end-side nipping piece 112a of the leading-end-side connection portion 112 extend to the same side in a direction perpendicular to the extending direction of the base 115.

The leading-end-side nipping piece 112a of the leading-end-side connection portion 112 is provided with the bonding member 116, like in the first embodiment. The other structure of the terminal member 110B according to the third embodiment is similar to that of the terminal member 110 according to the first embodiment.

Therefore, also in the third embodiment, the advantageous effects (1) to (4) of the first embodiment are obtained.

Further, in the third embodiment, the insulating film 117 (see FIG. 7) can be provided on the surface of the lead conductor 109, like in the second embodiment.

The embodiments described above illustrate a structure in which the leading-end-side connection portion 112 of each of the terminal members 110, 110A, and 110B and the leading end portion 109b of the lead conductor 109 are fixed by metal fusion bonding and the winding-side connection portion 111 of each of the terminal members 110, 110A, and 110B and the main body portion 109a of the lead conductor 109 are fixed by swaging. However, on the contrary, the leading-end-side connection portion 112 of each of the terminal members 110, 110A, and 110B and the leading end portion 109b of the lead conductor 109 may be connected by swaging and the winding-side connection portion 111 of each of the terminal members 110, 110A, and 110B and the main body portion 109a of the lead conductor 109 may be fixed by metal fusion bonding. Alternatively, these connection portions may be coupled by only one of metal fusion bonding and swaging. Further, a coupling structure using an adhesive material, or other mechanical coupling structures, such as pressure welding using an elastic member, or pressure welding using a terminal block to be fastened by a fastening member, may be employed in place of the coupling structure by swaging.

The embodiments described above illustrate a structure in which the terminal members 110, 110A, and 110B and the lead conductor 109 are connected at two positions, i.e., the winding-side and leading-end-side portions of the lead conductor 109. However, the terminal members 110, 110A, and 110B and the lead conductor 109 may be connected at three or more positions.

The structures of the terminal members 110, 110A, and 110B illustrated in the respective embodiments described above are illustrated by way of example only, and modifications of the structures of the terminal members 110, 110A, and 110B can be applied as appropriate.

While various embodiments and modified examples have been described above, the present invention is not limited to the contents of the embodiments and modified examples. The embodiments described above may be combined or modified as appropriate. Other aspects that can be considered within the technical idea of the present invention are included in the scope of the present invention.

REFERENCE SIGNS LIST 100 stator
101 stator core
102 stator coil
106 conductor
107 leading line portion
109 lead conductor
109a main body portion
109b leading end portion
110, 100A, 100B terminal member
111 winding-side connection portion
111a winding-side nipping piece
111b bent-back portion
112 leading-end-side connection portion
112a leading-end-side nipping piece
112b bent-back portion
113 connection portion
114 external connection portion
116 bonding member
117 insulating film
120, 120A terminal structure portion

The invention claimed is:
1. A stator comprising:
a winding wound around a stator core and having a lead conductor at an end thereof; and
a terminal member having a connection portion to the lead conductor of the winding, wherein
the connection portion of the terminal member includes a winding-side connection portion that fixes the lead conductor, and a leading-end-side connection portion that fixes a portion closer to a leading end of the lead conductor than the winding-side connection portion, the winding-side connection portion and the leading-end-side connection portion have a rectangular shape, each rectangular shape having a longitudinal side that extends in a direction that is perpendicular to a longitudinal axis of the lead conductor, and the lead conductor defines, in a region midway between each rectangular shape a boundary portion, the boundary portion having a slope so that, beginning at the region midway, the lead conductor is gradually tapered from the winding-side toward the leading-end-side, the boundary portion extending coextensively with a longitudinal axis of the terminal member.

2. The stator according to claim 1, wherein the leading-end-side connection portion of the terminal member is connected to the lead conductor by metal fusion bonding, and the winding-side connection portion of the terminal member is fixed to the lead conductor by coupling different from the metal fusion bonding.

3. The stator according to claim 1, wherein a quantity of heat transferred from the lead conductor to the winding-side connection portion of the terminal member is smaller than a quantity of heat transferred from the lead conductor to the leading-end-side connection portion of the terminal member.

4. The stator according to claim 3, wherein a layer for reducing the quantity of heat transferred from the winding-side connection portion to the lead conductor is interposed between the lead conductor and the winding-side connection portion of the terminal member.

5. The stator according to claim 1, wherein the winding-side connection portion and the leading-end-side connection portion each include a base and a nipping piece, the nipping piece being integrally formed with the base and nipping one surface of the lead conductor and another surface facing the one surface, and the nipping piece includes a bent-back portion bent toward the other surface from the one surface of the lead conductor.

6. The stator according to claim 5, wherein the bent-back portion of the nipping piece of the winding-side connection portion and the bent-back portion of the nipping piece of the leading-end-side connection portion are arranged in a direction opposite to the base in a direction perpendicular to the base of the lead conductor.

7. The stator according to claim 5, wherein the bent-back portion of the nipping piece of the winding-side connection portion and the bent-back portion of the nipping piece of the leading-end-side connection portion are arranged in the same direction of the base in a direction perpendicular to the base of the lead conductor.

8. The stator according to claim 5, wherein at least one of the bent-back portion of the nipping piece of the winding-side connection portion and the bent-back portion of the nipping piece of the leading-end-side connection portion is arranged at both sides of the base in a direction perpendicular to the base of the lead conductor.

9. A rotary electric machine comprising the stator according to claim 1.

10. A manufacturing method for a stator including a winding wound around a stator core and having a lead conductor at an end thereof, and a terminal member having a connection portion to the lead conductor of the winding, the connection portion of the terminal member including a winding-side connection portion that fixes the lead conductor, and a leading-end-side connection portion that fixes a portion closer to a leading end of the lead conductor than the winding-side connection portion, the manufacturing method comprising:

a first step of fixing the lead conductor and the leading-end-side connection portion by metal fusion bonding;

a second step of fixing the lead conductor and the winding-side connection portion by coupling different from the metal fusion bonding;

forming the winding-side connection portion and the leading-end-side connection portion to have a rectangular shape, each rectangular shape having a longitudinal side that extends in a direction that is perpendicular to a longitudinal axis of the lead conductor; and forming the lead conductor in such a way that the lead conductor defines, in a region midway between each rectangular shape, a boundary portion, wherein the boundary portion has a slope so that the lead conductor, beginning at the region midway, is gradually tapered from the winding-side toward the leading-end-side, the boundary portion extending coextensively with a longitudinal axis of the terminal member.

* * * * *